United States Patent
Goertz et al.

(10) Patent No.: US 12,409,397 B2
(45) Date of Patent: Sep. 9, 2025

(54) FLUID FILTRATION APPARATUSES, SYSTEMS, AND METHODS

(71) Applicant: DONALDSON COMPANY, INC., Minneapolis, MN (US)

(72) Inventors: Matthew P. Goertz, Bloomington, MN (US); Andrew J. Dallas, Lakeville, MN (US); Derek O. Jones, Andover, MN (US); Yehya Elsayed, Dearborn, MI (US)

(73) Assignee: Donaldson Company, Inc., Bloomington, MN (US)

( * ) Notice: Subject to any disclaimer, the term of this patent is extended or adjusted under 35 U.S.C. 154(b) by 119 days.

(21) Appl. No.: 16/637,344

(22) PCT Filed: Aug. 9, 2018

(86) PCT No.: PCT/US2018/045918
§ 371 (c)(1),
(2) Date: Feb. 7, 2020

(87) PCT Pub. No.: WO2019/032773
PCT Pub. Date: Feb. 14, 2019

(65) Prior Publication Data
US 2021/0354059 A1     Nov. 18, 2021

Related U.S. Application Data

(60) Provisional application No. 62/543,456, filed on Aug. 10, 2017.

(51) Int. Cl.
*B01D 25/26*     (2006.01)
*B01D 29/46*     (2006.01)
*B01D 39/16*     (2006.01)

(52) U.S. Cl.
CPC ............. *B01D 25/26* (2013.01); *B01D 29/46* (2013.01); *B01D 39/1607* (2013.01); *B01D 2239/065* (2013.01); *B01D 2239/1216* (2013.01)

(58) Field of Classification Search
CPC ...... B01D 25/00; B01D 25/001; B01D 25/12; B01D 25/21; B01D 27/00; B01D 27/02;
(Continued)

(56) References Cited

U.S. PATENT DOCUMENTS

| 3,401,803 A | 9/1968 | Bub |
| 3,521,429 A | 7/1970 | Leffler |

(Continued)

FOREIGN PATENT DOCUMENTS

| CN | 1902384 A | 1/2007 |
| CN | 106170620 A | 11/2016 |

(Continued)

OTHER PUBLICATIONS

International Search Report for co-pending PCT/US2018/045918, 4 pages, Nov. 8, 2018.

(Continued)

*Primary Examiner* — Allison G Fitzsimmons
(74) *Attorney, Agent, or Firm* — Kagan Binder, PLLC

(57) ABSTRACT

A filter including a first flow face extending along a lateral direction and a transverse direction of the filter, wherein the first flow face includes at least one contaminant retention layer first edge and at least one flow defining layer first edge, a second flow face spaced in an axial direction from the first flow face, wherein the second flow face extends along the length and the width of the filter and includes at least one contaminant retention layer second edge and at least one flow defining layer second edge, at least one contaminant retention layer extending from the contaminant layer first
(Continued)

edge to the contaminant layer second edge, and at least one flow defining layer adjacent to at least one of the contaminant retention layers, the at least one flow defining layer extending from the flow defining layer first edge to the flow defining layer second edge, wherein at least one of the flow defining layers defines at least one fluid flow path in the axial direction as fluid moves from the first flow face toward the second flow face.

20 Claims, 8 Drawing Sheets

(58) Field of Classification Search
CPC ........ B01D 27/04; B01D 27/06; B01D 27/07; B01D 27/14; B01D 27/142; B01D 27/146; B01D 29/00; B01D 29/0002; B01D 29/0004; B01D 29/0018; B01D 29/002; B01D 29/0022; B01D 29/0027; B01D 29/0068; B01D 29/0093; B01D 29/0095; B01D 29/01; B01D 29/012; B01D 29/05; B01D 29/03; B01D 29/50; B01D 29/56; B01D 29/58; B01D 29/44; B01D 29/46; B01D 29/48; B01D 39/08; B01D 39/10; B01D 39/16; B01D 46/10; B01D 46/121; B01D 46/14; B01D 46/40; B01D 46/52; B01D 46/54; B01D 46/56; B01D 46/58; B01D 46/60; B01D 46/62; B01D 46/64; B01D 2239/00; B01D 2239/02; B01D 2239/06; B01D 2239/065; B01D 2239/00654; B01D 2267/30; B01D 2267/40; B01D 2267/60; B01D 2267/70; B01D 25/002; B01D 25/004; B01D 25/007; B01D 25/008; B01D 25/164; B01D 25/176; B01D 25/215; B01D 27/08; B01D 35/00; B01D 35/005; B01D 35/30; B01D 39/00; B01D 39/14; B01D 39/086; B01D 63/08; B01D 63/081; B01D 63/082; B01D 69/06; B01D 69/10; B01D 69/107; B01D 69/12; B01D 69/1213; B01D 69/1216; B01D 69/1218; B01D 71/00; B01D 2201/34; B01D 2201/342; B01D 2201/345; B01D 2271/00; B01D 2271/02; B01D 2275/00; B01D 2275/10; B01D 2275/205
See application file for complete search history.

(56) References Cited

U.S. PATENT DOCUMENTS

| | | | |
|---|---|---|---|
| 4,271,025 A | | 6/1981 | Erdmannsdorfer |
| 4,589,983 A | * | 5/1986 | Wydevan ............. B01D 46/005 210/489 |
| 5,141,714 A | * | 8/1992 | Obuchi ................. F01N 3/2882 422/177 |
| 5,225,080 A | * | 7/1993 | Karbachsch ......... B01D 25/001 210/489 |
| 5,308,370 A | | 5/1994 | Kraft et al. |
| 5,820,646 A | * | 10/1998 | Gillingham ............ B01D 25/24 55/498 |
| 5,968,373 A | * | 10/1999 | Choi ...................... B01D 39/06 210/489 |
| 6,273,938 B1 | * | 8/2001 | Fanselow ........... B01D 46/0036 55/497 |
| 6,540,913 B1 | | 4/2003 | Guichaoua et al. |
| 8,220,640 B2 | * | 7/2012 | Schmitz ................ B01D 29/46 210/231 |
| 10,058,807 B2 | | 8/2018 | Dallas et al. |
| 10,337,471 B2 | | 7/2019 | Kaufmann et al. |
| 2006/0254973 A1 | | 11/2006 | Olsen et al. |
| 2009/0200226 A1 | * | 8/2009 | Straeffer ................ B01D 63/12 210/321.74 |
| 2010/0307134 A1 | | 12/2010 | Sangiovani |
| 2017/0203247 A1 | | 7/2017 | Lee |

FOREIGN PATENT DOCUMENTS

| | | |
|---|---|---|
| CN | 106973567 A | 7/2017 |
| EP | 0842689 A2 | 10/1997 |
| FR | 2148726 A5 | 3/1973 |
| WO | 2005105265 A1 | 11/2005 |
| WO | 2007/145939 A3 | 12/2007 |
| WO | 2015/155700 A2 | 10/2015 |

OTHER PUBLICATIONS

Loftus, et al., "A New Method for Combination Full-Flow and Bypass Filtration: Venturi Combo," Society of Automotive Engineers, Inc., 7 pages, 1997.

Office Action, and translation thereof, from counterpart Chinese Application No. 2022105471636, dated Nov. 7, 2023, 16 pp.

Communication Pursuant to Article 94(3) EPC for co-pending EP21186473.1, 5 pages, Jan. 2, 2023.

* cited by examiner

FLUID FILTRATION APPARATUSES, SYSTEMS, AND METHODS

CROSS REFERENCE TO RELATED APPLICATIONS

This application claims priority to International Application No. PCT/US2018/045918, filed on Aug. 9, 2018, which in turn claims the benefit of U.S. Provisional Application No. 62/543,456, filed Aug. 10, 2017, the entire contents of which are incorporated herein by reference in their entireties.

TECHNICAL FIELD

The present invention relates to filtration apparatuses, systems, and methods that are typically used in filtering contaminants from fluids, and more particularly relates to filter arrangements that provide for fluid movement that is directed generally parallel to the face of the filter media.

BACKGROUND

Fluid streams of, for example, fuel, lubricant, or hydraulic oil often carry contaminant material such as dust and other particulates to engines for construction equipment, diesel engines, and the like, such as particulate contaminant that can damage and/or negatively impact the performance of such equipment. In many instances, it is necessary and/or desired to filter some or all of the incoming contaminant material from the fluid stream to protect downstream components from being damaged by contaminants. A number of fluid filter arrangements have been developed for contaminant removal and are often particularly designed to cooperate within certain spaces within or adjacent to the equipment.

In certain filtration applications, fluid is moved along a fluid path and passed through a relatively planar surface of one or more sheets of filter material arranged in a stack within a housing. When multiple filter sheets are used, the sheets are commonly arranged such that the generally planar surface of each sheet is in contact with a planar surface of an adjacent sheet. The filter sheets are designed or chosen to correspond to the size and type of particles that are to be removed from the fluid. For instance, the filter sheets selected for a particular filtering system typically include pores that are smaller than the particles that are desired to be captured as the fluid is passing through the thickness of the filter sheet from one side to the other side. Because the filter sheets are installed in such a way that they obstruct the free flow of fluid along a fluid path, the pressure of the fluid will be higher on the entry side of the filter sheets than the pressure of the fluid after it passes through the filter sheets. This concept is referred to as differential pressure or pressure drop across the filter sheets.

Over time, articles captured by the filter during its use will block or "load" an increasing number of the pores in the filter sheets, leading to an increased pressure drop across the filter. The pressure drop will eventually reach an unacceptable level, after which the filter material will need to be cleaned or replaced to allow for continued operation of the equipment. Although it is expected to periodically need to clean and/or replace such filters, it is desirable to increase the time between filter cleanings and/or replacements so that manufacturing or other operations have minimal disruption. Thus, there is a continued need to provide filtration systems that effectively remove contaminants from fluid while increasing the life of the filters to avoid issues such as premature fluid filter plugging.

SUMMARY

Filter systems that include filter materials arranged in accordance with the invention are referred to as "flow-by" filters of the invention, which are structured with at least two kinds of material layers arranged in, for example, a stacked or rolled configuration. These filters provide for relatively constant removal efficiency for many types and sizes of contaminants and/or particles. The flow-by filters also exhibit efficiency decreases during contaminant loading, and the differential pressure change is minimal throughout loading. However, the clean media pressure drop is relatively high. Combining the performance characteristics described herein for flow-by filters provide for many possible application scenarios that can benefit from this filtration configuration. It is contemplated that filters of the invention can be used for filtration of a wide variety of different substances, such as fuel, water, air, or the like, and can capture a wide variety of particulate and/or droplet contaminants.

In one aspect of the invention, a filter is provided that comprises a first flow face extending along a lateral direction and a transverse direction of the filter, wherein the first flow face comprises at least one contaminant retention layer first edge and at least one flow defining layer first edge, a second flow face spaced in an axial direction from the first flow face, wherein the second flow face extends along the length and the width of the filter and comprises at least one contaminant retention layer second edge and at least one flow defining layer second edge, at least one contaminant retention layer extending from the contaminant layer first edge to the contaminant layer second edge, and at least one flow defining layer adjacent to at least one of the contaminant retention layers, the at least one flow defining layer extending from the flow defining layer first edge to the flow defining layer second edge. At least one of the flow defining layers defines at least one fluid flow path in the axial direction as fluid moves from the first flow face toward the second flow face.

In another aspect of the invention, a method of filtering fluid is provided, the method including the steps of positioning a filter in a fluid flow path, the filter comprising a first flow face extending along a length and a width of the filter, wherein the first flow face comprises at least one contaminant retention layer first edge and at least one flow defining layer first edge, a second flow face spaced in an axial direction from the first flow face, wherein the second flow face extends along the length and the width of the filter and comprises at least one contaminant retention layer second edge and at least one flow defining layer second edge, at least one contaminant retention layer extending from the first flow face to the second flow face, and at least one flow defining layer adjacent to at least one of the contaminant retention layers, the at least one flow defining layer extending from the first flow face to the second flow face, wherein the at least one flow defining layer causes a material flow in the axial direction as fluid moves from the first flow face toward the second flow face. The method further includes the step of moving fluid along the fluid flow path, wherein the fluid flow path extends in the axial direction from the first flow face toward the second flow face.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
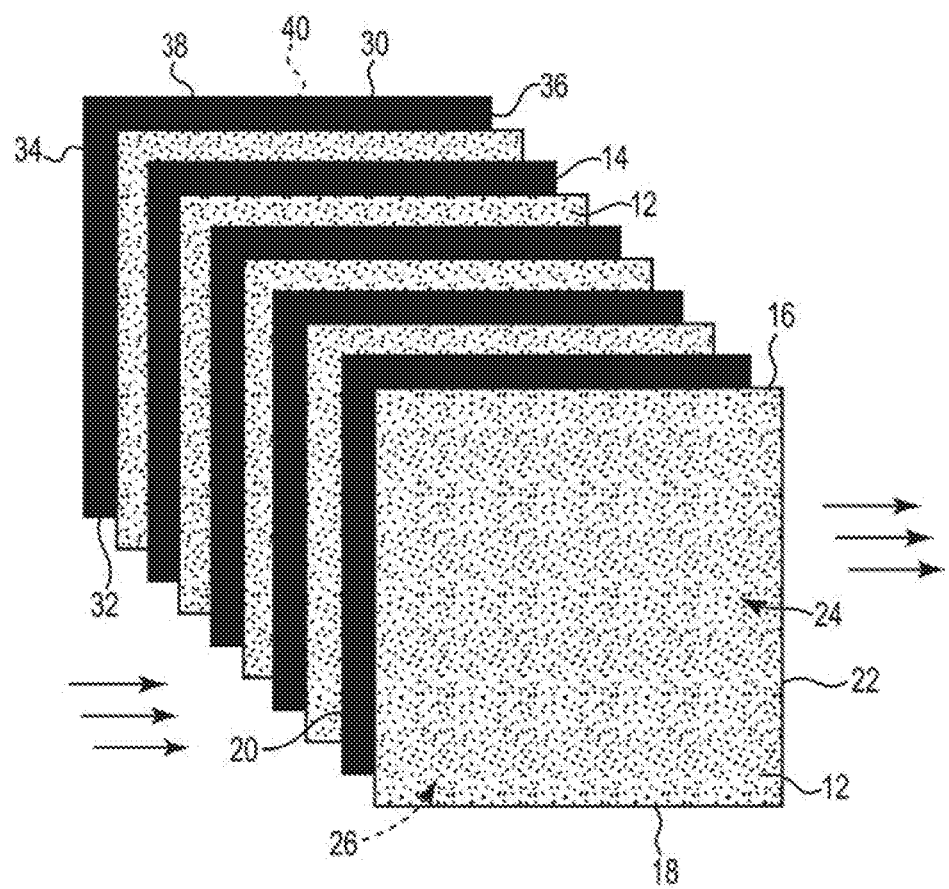
FIG. 1 is a schematic front view of a filter configuration of the invention that includes multiple contaminant retention layers and multiple flow defining layers.

Referring now to the Figures, wherein the components are labeled with like numerals throughout the several Figures, and initially to FIG. 1, a schematic view of a filter arrangement of the invention is illustrated. This filter arrangement is referred to herein as "flow-by" filtration, in that material containing contaminant that flows through the filter from an inlet flow face to an outlet flow face is directed generally parallel to the planar surface (e.g., top and bottom surfaces) of multiple layers of filter media so that the material flows "by" the surface of the filter media rather than through it. Such an arrangement is generally perpendicular to traditional filter arrangements in which fluid flows directly through the pore structure of the filter media (i.e., through the thickness of the filter media, such as from a top planar surface to a bottom planar surface).

In the flow-by filter configurations of the invention, multiple layers of material are arranged in a stack such that the edges of the layers lie generally in the same plane, which is referred to herein as a flow face. Such a flow face is therefore a surface defined by the edges of the layers, wherein this flow face is generally perpendicular to the direction in which material will flow relative to the stack and is located where the material enters and/or exits the stack or configuration of filter material. A number of variations of filter stacks or layers are described herein that are used to make up various flow faces of the invention. For example, as will be explained below, many of the embodiments of this flow face will comprise the stacked edges of multiple layers, wherein all of the layer edges may be aligned with each other or the flow face may instead include an irregular surface made up of staggered edges of layers, as will be discussed in further detail below.

FIG. 1 schematically illustrates a stack 10 of filter media including flow defining sheets or layers 12 alternating with contaminant or particle retention sheets or layers 14 through the thickness of the stack. Although certain figures and descriptions provided herein of exemplary configurations illustrate rectangular "sheets" of material, it is understood that these sheets are representative and therefore can be provided as layers that are configured in a number of alternative ways. For one example, the layers may be provided as continuous lengths of material that are folded or otherwise arranged into a configuration that does not have all of the specific edges provided by individual flat sheets. In another example, the layers may have a different outer shape, such as round, oval, triangular, trapezoidal, and the like, as will be described below in further detail. In another example, the layers are provided more as "zones" of varying permeability across the stack. In these or other configurations, it is understood that the "flow-by" principles of the invention are applicable in the same or a similar manner that is applicable for stacked sheets.

Each flow defining layer 12 includes a first or top edge 16, a second or bottom edge 18 opposite the first edge 16, and side edges 20, 22 extending between the first and second edges 16, 18. Each flow defining layer 12 also includes a first face surface 24 and an opposite second face surface 26. The flow defining layers 12 are used to define a flow path through the stack 10 of filter material. Similarly, each contaminant retention layer includes a first or top edge 30, a second or bottom edge 32 opposite the first edge 30, and side edges 34, 36 extending between the first and second edges 30, 32 of the contaminant retention layer 14. Each contaminant retention layer 14 also includes a first face surface 38 and an opposite second face surface 40. The two distinct layers 12, 14 having differing fiber constructions are utilized for their individual roles in the composite structure of the stack 10. That is, the flow defining layers 12 perform the function of defining a flow path through the filter, while the contaminant retention layers 14 perform the function of retaining or capturing contaminants that are transported to its pore structure, such as contaminants in a liquid.

Although it is not required, in order to maximize the filtration performance of the filter stacks of the invention, the edges of the flow defining layers and the contaminant retention layers are generally aligned with each other in each stack. In certain embodiments, the stack will generally fill the housing or other structure in which it is positioned in order to maximize the amount of material available for filtration in a given volume. However, other embodiments may include layers of different sizes and/or shapes so that the edges of the various layers can be staggered in an ordered or random arrangement along the height of the stack. In any of the arrangements where the edges of the layers are not aligned along a plane, the flow face will still comprise the edges of the layers facing the direction in which material flow is entering or exiting the filter stack.

The flow defining layers 12 can be configured as a mesh or screen type of structure having relatively large intersecting fibers or strands, as compared to the fibers in the contaminant retention layers. The relatively large fibers and corresponding large pores of the flow defining layers contribute to the composite flow permeability of the invention. Although the flow-by filters of the invention are configured so that contaminated material flows generally across the surfaces of the multiple layers, the size of the pores or openings are measured or sized lateral to the direction of flow (i.e., the flow-through direction). That is, the pore size is measured and selected to provide desired flow characteristics, even though the filter is not arranged for material to flow through the thickness of the filter material.

The contaminant retention layers 14 can be configured as a mesh or screen type of structure having relatively small intersecting fibers or strands, as compared to the fibers in the flow defining layers. Holes or openings that are created by these intersecting strands may be referred to as pores. The pores sizes are designed or selected with consideration of the size of the contaminants to be captured by the particular contaminant retention layer. Alternatively, the contaminant retention layers may be made from materials that do not have a mesh or screen type structure but still include pores or openings to allow for flow while the area surrounding the openings can catch or stop the contaminants.

A common technique used for measuring the pore sizes of either or both of the flow defining layers and the contaminant retention layers is capillary flow porometry. This technique use capillary theory to calculate pore sizes based on the relationship of the surface tension of a liquid, pressure, and diameter of each pore. This measurement method uses a non-reacting liquid to completely wet and fill the pores of the porous material with a fluid that has a very low contact angle to the material. The saturated material is then pressurized with a non-reacting gas while measuring the pressure and air flow until all of the liquid has been forced out of the pores. With this technique, smaller pore sizes will require higher pressure to force the liquid out of the pores, with the opposite result for larger pore sizes. The collected data is then compared to pressure and flow measurements of a clean, dry sample to calculate the pore size distribution. In this measurement, the mean flow pore size is defined at the point for which the wetted sample airflow is equal to half of the dry sample airflow.

In general for various embodiments of the invention, the pore sizes of the flow defining layer, when measured in the flow through orientation using the above described techniques and/or other techniques, are greater than the sizes of the pores of the contaminant retention layer (also measured in the flow through direction). In certain embodiments, the sizes of the pores of the contaminant retention layer are in the range of 1-200 microns measured in the flow through orientation, but can more specifically be in the range of 1-100 microns, more specifically 1-50 microns, more specifically 1-25 microns, more specifically 1-15 microns, or even more specifically 1-10 microns.

In an embodiment of the invention, each flow defining layer 12 is a single layer, with the structure being designed to guide fluid flow through the stack 10 primarily along the face of the contaminant retention layers 14. The thickness, spacing, and arrangement of the fibers or strands, along with the overall thickness of the flow defining layer, can be varied to achieve desired filtration performance. In one exemplary embodiment of the invention, the overall thickness of the flow defining layer is in the range of approximately 200 $\mu m$-5000 $\mu m$, more specifically in the range of 200 $\mu m$-2000 $\mu m$, and more specifically in the range of 500 $\mu m$-1000 $\mu m$, although the thickness can be smaller or larger than these thickness ranges. When a flow defining layer 12 is relatively thin, it provides more resistance than when thicker layers are used. On the other hand, when a flow defining layer 12 is relatively thick, the capture efficiency of the composite filter structure can be relatively low. Therefore, a balance of resistance and capture efficiency can be considered when choosing the thickness of the flow defining layer.

Figure 2:
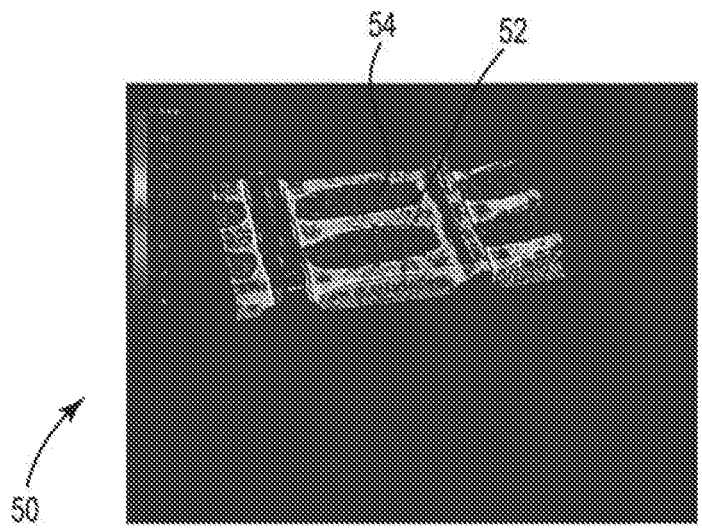
FIG. 2 is a perspective optical microscope view of an exemplary flow defining layer of the invention.
Figure 3:
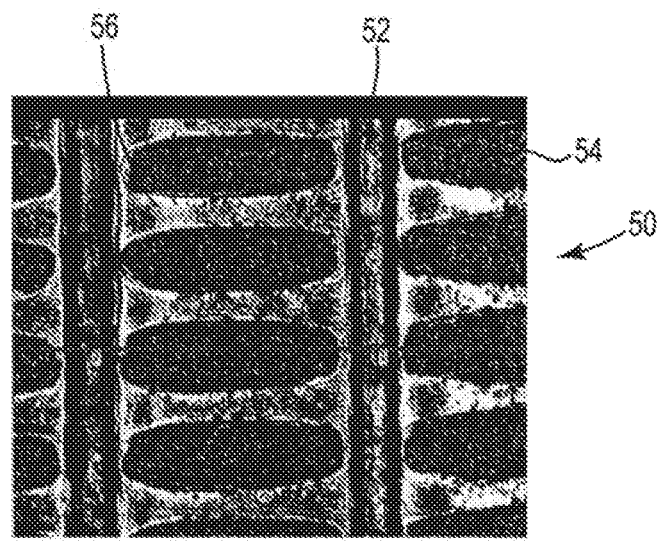
FIG. 3 is a top optical microscope view of an of an exemplary flow defining layer of the invention.

FIGS. 2 and 3 are perspective and top optical microscope views, respectively, of an of an exemplary flow defining layer 50 of the invention. As shown, the flow defining layer 50 includes spacers or spacer strands 52, which may vary in size, shape and strand density. One exemplary embodiment includes spacers 52 having a thickness between 200 $\mu m$ and 500 $\mu m$, for example. These spacers 52 will be generally aligned with the flow direction when in a stack of layers. Ribbon-like strands 56 are arranged generally orthogonally to the spacers 52 and are considerably smaller than the larger strands 52. The strands 56 can be approximately 100 $\mu m$, for example.

The thickness of each of the flow defining layers is selected to provide desired performance for the filter stack, in that flow defining layers that are too thin will provide too much resistance (low permeability) and flow defining layers that are too thick will exhibit unacceptably low capture efficiency for a particular application. Thus, it is desired to select flow defining layers that optimally align with the most important desired parameters for a particular filtration application.

Filter embodiments of the invention can be provided with filtration zones of varying permeability to provide desired filtration performance. In such embodiments, the permeability of the filtration material will be measured from one flow face to the other, although the permeability can vary in any direction relative to the stack. For example, the permeability may be constant across the width of a stack, but increase or decrease when moving from flow face to flow face of a stack. In an alternative example, the permeability may instead vary across the width of a stack. Other variations of permeability zones are also contemplated and designed to provide desired filtration performance.

Many alternatives to the flow defining layers are contemplated and considered to be within the scope of the invention. In one exemplary embodiment of the flow defining layer, the layer is not provided with continuous strands but instead includes a patterned structure such as dots, dimples, craters, and/or other raised or recessed structures arranged in a patterned grid. In another exemplary embodiment of the flow defining layers, the layers are provided with a completely random or partially random arrangement of dots, dimples, craters, and/or other raised or recessed structures across the face of the flow defining layers.

Referring again to FIG. 1, the contaminant retention layers 14 are generally configured to be able to capture contaminant or particles as material flows generally by or past their first and second face surfaces 38, 40. However, because the material from which the contaminant retention layers 14 is made can comprise multi-fiber material formed into a sheet or layer, the face surfaces 38, 40 are textured in such a way that contaminants will contact the fibers as the fluid flows past the surface. As with the flow defining layers, the choice of filter material for a contaminant retention layer can be selected to provide desired performance characteristics for the filter.

Figure 4:
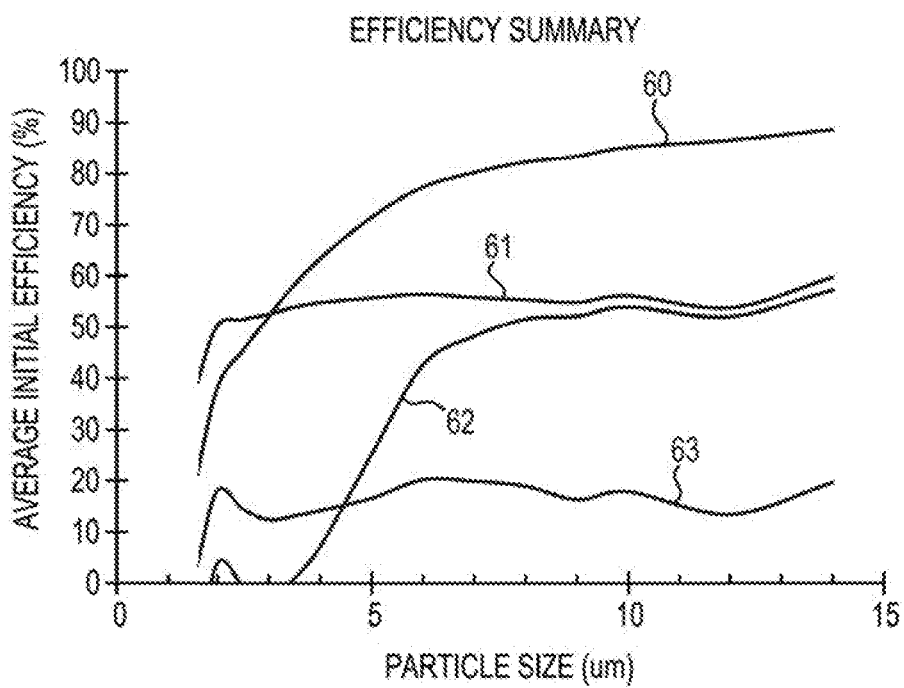
FIG. 4 is a graph of the average initial efficiency of certain contaminant sizes for multiple exemplary filtration materials.

FIG. 4 is a graph that illustrates the initial (clean) particle removal efficiency for several exemplary filter materials utilized for contaminant or particle retention, in accordance with the invention. For this comparison, four flow-by filters were constructed with the same flow-defining layer but with different contaminant retention materials. The performance of these four filters relative to their respective efficiencies is designated by curves 60-63. The materials represented by curves 60-63 were arranged in stacks that were subjected to similar compression during their assembly, as will be discussed in further detail below. As shown in FIG. 4, the ability of these flow-by filters to capture different sized contaminants with relatively equal efficiency can be controlled by utilizing specific contaminant retention layers. For example, the samples represented by curves 61 and 63 produced a relatively flat curve, indicating that the efficiency was relatively constant for all particle sizes. This consistent efficiency occurred with filter media having a significant amount of pores in the size range of the particles to be captured, as defined in the flow-through direction (i.e., relatively small pores are needed to capture small particles). One exemplary material that can exhibit this quality is the Synteq XP efficiency material having a $\beta_{1000} \geq 4$ μm (measured using ISO 16889) diesel fuel flow-through filters, as are commercially available from Donaldson Company, Inc. of Bloomington, Minnesota. Such a filter material is considered to be high performance flow through filter media that provides for high filtration efficiency, provides for relatively low differential pressure, has high dirt holding capacity, and is binder free.

In order to increase the solidity of the filter material stack, it can be compressed or calendared in such a way that the fiber size of the material is maintained. The material represented by the curve 63 of FIG. 4 provides for such a compressed/calendared material, which shows a slightly lower efficiency than those materials that were subjected to less compression or calendaring. Also shown in FIG. 4 are curves 60 and 62 representing two additional materials that were used as contaminant retention layers and did not demonstrate a flat efficiency response curve. The filters of the invention can be positioned in a number of different filter housings and configurations, wherein the amount of compression of the stack 10 can contribute to particular performance results for the filter. That is, while the choices of flow defining layers 12 and contaminant retention layers 14 are important to achieving desired filtration performance, the compression of the stacks of layers also contributes to the conditions desired for intimate interfacial contact between the flow defining layers 12 and adjacent contaminant retention layers 14. In an exemplary embodiment, relatively low compression (e.g., undesirably low compression) allows defect gaps to form between the flow defining layers 12 and adjacent contaminant retention layers 14. When contaminated fluid moves toward these gaps, the gaps tend to expand in size, which provides an easy path for more flow of contaminants into and through the gaps. These defect areas therefore carry a large portion of the fluid flow, along with a correspondingly larger portion of the contaminants.

Conversely, when there is too much compression of the stacked layer structure, a well-defined initial flow path or channel will not be easily established and channeling can also occur, causing fluid to be forced into defect areas rather than along the intended flow path. Again, the defect areas gaps will tend to expand in size, which forces even more flow and contaminants through the gaps. In this way, these defect areas will carry a large portion of the fluid flow, along with a correspondingly larger portion of the contaminants. Further, these gaps produce lowered removal efficiency, thereby decreasing the performance of the filtration material. It is desired for the amount of compression to be less than the amount that will force contaminant retention layers 14 to be in direct contact with each other through the gaps in adjacent flow defining layers 12, since this interface between contaminant retention layers will have minimal or non-existent fluid flow along a flow-by fluid flow path. Without fluid flow in these areas, the contaminant retention layers 14 will not be able to capture a desirable amount of contaminants in accordance with the flow paths defined by the layers of the present invention.

Figure 5:
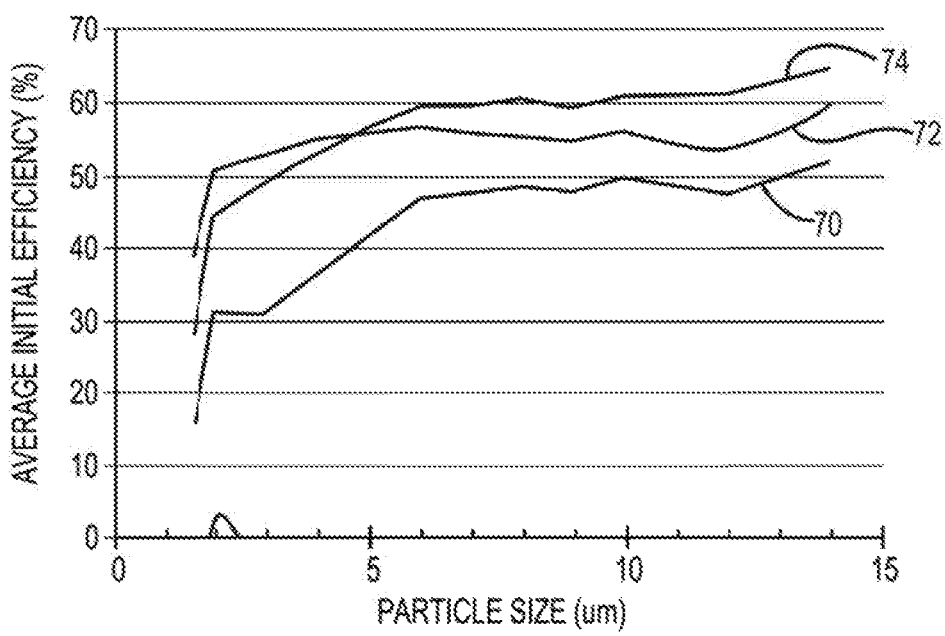
FIG. 5 is a graph showing the effect of compression on the efficiency of three different exemplary sets of contaminant or particle retention layers and flow defining layers.

Referring now to the graph of FIG. 5, the effect of compression on initial particle removal efficiency is illustrated for layers arranged in a flow-by configuration, in accordance with embodiments of the invention. In order to vary the compression of a stack of alternating layers for purposes of the information obtained for this graph, a fixed container geometry was provided with differing numbers of stacked layers such that the compression was higher when more layers were included in the container. In particular, line 70 represents a configuration with 50 layers in a stack (and therefore the lowest level of compression of the three samples), line 72 represents a configuration with 55 layers in a stack (and therefore the medium level of compression of the three samples), and the line 74 represents the configuration with 60 layers in the stack (and therefore the highest level of compression of the three samples).

The pressure during the tests was measured in diesel fuel at 1 liter/minute across (i.e., "flowing by") layers of a filter that was approximately 0.86 inches wide by 3 inches long by 2 inches deep. Efficiency was measured with particle counters and ISO12103-1 A2, fine test dust. In accordance with these configurations that were generated as described herein relative to flow-by filter stacks, compression of the layers was in the range of 1 to 3 psi, although higher or lower compression levels are considered to be within the scope of the invention. The sample represented by the line 74, which had the highest level of compression, produced the largest initial pressure drop and the largest initial particle removal efficiency. The sample represented by the line 70 produced the lowest initial pressure drop and had the smallest initial particle removal efficiency. The sample represented by the line 72 had a medium initial pressure drop and a medium initial particle removal efficiency at almost all particle sizes besides the smallest particles.

The compression applied to the stacks of layers in a particular filter can be static, such as in cases where the layers are positioned in a container or housing of a fixed size. In such a case, changing the compression on the stack will require adding or removing layers until a desired compression is achieved. However, it is also contemplated that a stack of alternating flow defining layers and contaminant retention layers can be subjected to variable compression, such as can be applied by a spring or other outside changeable force. In such a case, the compression on the stack can be changed to accommodate different fluids, operating conditions, and the like.

Figure 6:
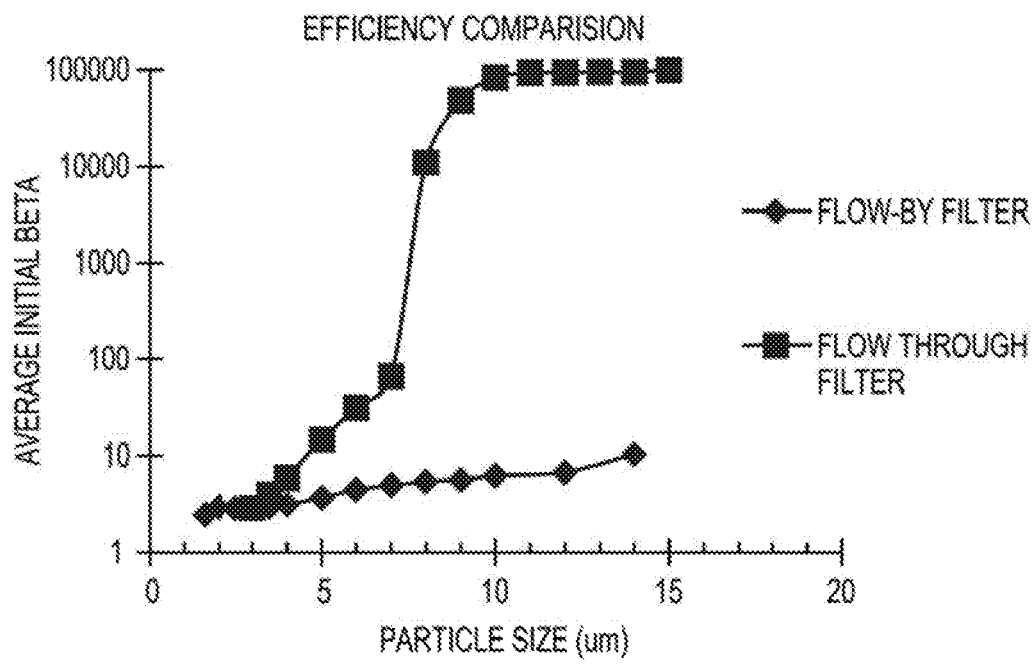
FIG. 6 is a graph comparing the efficiency at various contaminant sizes of a standard flow-through filter arrangement to an exemplary flow-by filter arrangement of the invention.

The filtration performance metrics of both loading and contaminant capture efficiency contrast the differences between flow-by and flow-through filters. For flow-through filters, the removal efficiency of non-adhesive contaminants is related to the pore size distribution of the media. This is because the likelihood of a contaminant to be captured and sieved is determined by how much flow travels through pores smaller than the size of that contaminant. This typically results in a large increase in efficiency for flow-through filters with an increase in contaminant size, as is illustrated in FIG. 6. For this comparison, a relatively low contaminant concentration of 1 mg/1 l was passed through both flow-through and flow-by filter systems for approximately 30 minutes, with the average initial beta removal values being recorded for a number of different contaminant sizes. FIG. 6 shows a relatively flat curve for the flow-by filter, which is an indication that the flow-by filters of the invention can produce a relatively constant trend between removal efficiency and contaminant size.

Figure 7:
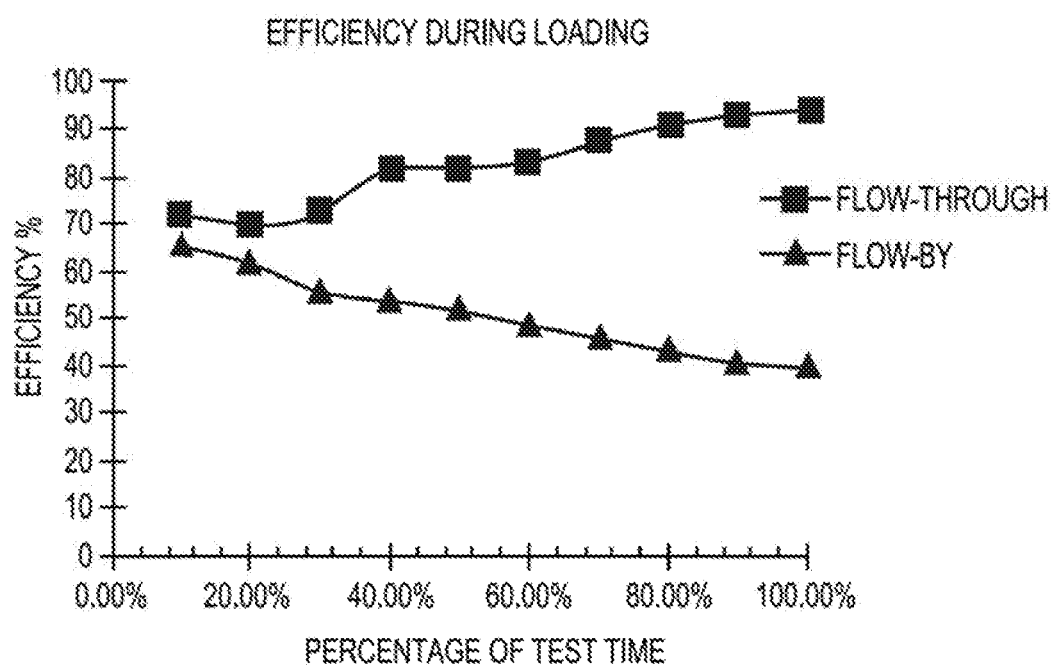
FIG. 7 is a graph showing efficiency changes during loading experiments for both an exemplary flow-by filter arrangement of the invention and a standard or conventional flow-through filter arrangement.

However, overall efficiency levels are typically less for flow-by filters than what is typical for flow-through filters, as is illustrated by the graph of FIG. 7. The efficiency of a flow-through filter during loading was measured with particle counters, and the upper line of the graph represents the efficiency for all particles equal to or greater than 4 µm. With flow-through filters represented by the lower line of the graph, the efficiency increases during loading due to contaminants filling the media pore structure and increasing the overall solidity of the media plus dust cake. In this test, the efficiency was at approximately 70 percent at the start of the test and increased to over 90 percent by the end of the test. In contrast, the efficiency of a flow-by filter was measured through turbidity meters and the curve of FIG. 7 represents the collective measurement for all particles in a sample of 0-3 µm test dust. In this test, the efficiency was at approximately 65 percent at the start of the test and decreased to less than 40 percent by the end of the test. That is, the flow-by filters of the invention showed a slight decrease in efficiency during loading, wherein fluid passes only along the exposed faces of the contaminant retention layers instead of flowing fully through the pore structure of the filter layers. Only after the surface pores of the contaminant retention layers of the invention fill with contaminant is there a substantial decrease in observed efficiency.

Figure 8:
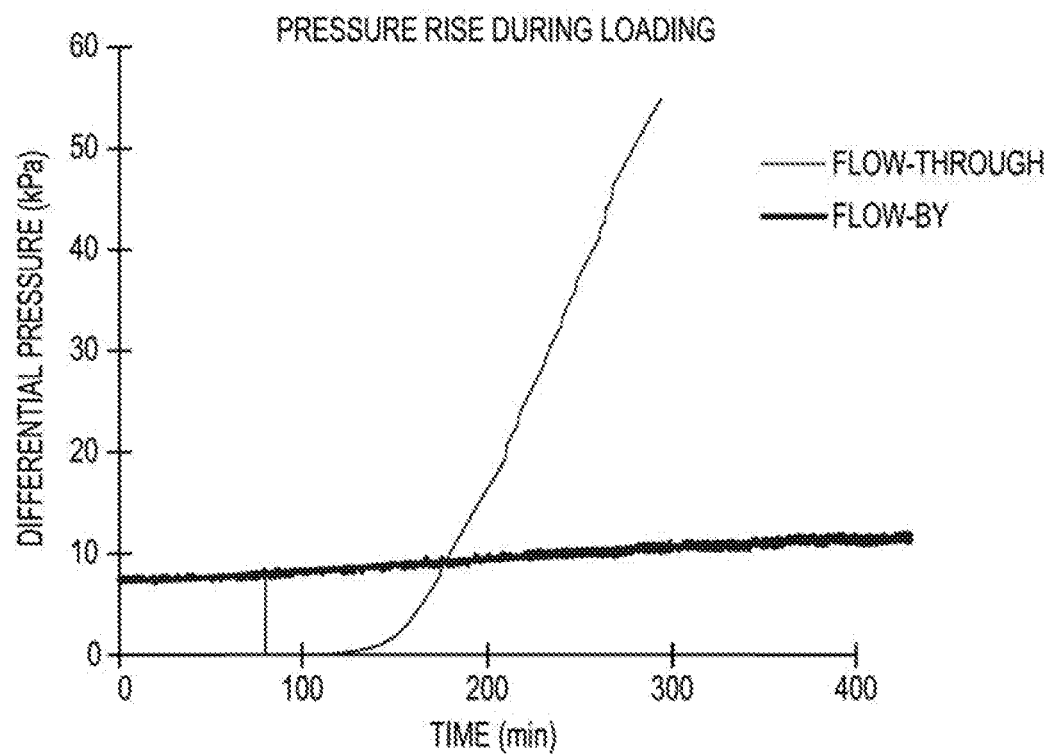
FIG. 8 is a graph showing differential pressure changes during loading experiments for both an exemplary flow-by filter arrangement of the invention and a standard or conventional flow-through filter arrangement.

A further comparison between traditional flow-through filters and the flow-by filters of the invention relative to the change in differential pressure measured across the filter as it loads with contaminants or particles is illustrated in the graph of FIG. 8. In general, the useful life of a flow-through filter is reached when the pressure rise accompanying captured contaminant matches or exceeds a certain level. The threshold level or limit is often determined by the pressure drop that is acceptable for the equipment in which the filter is installed. This limit may be referred to as "filter plugging" and requires cleaning contaminant from the filter or removal and replacement of the filter in order to continue filter operations. For purposes of the graph of FIG. 8, the differential pressure changes during loading were measured using filters that were subjected to 40 mg/l of ISO12103-1 A2, fine test dust in diesel fuel at a flow rate of 1 liter/min. The flow-through filter had an exposed media face of approximately 620 cm$^2$. In comparison, although flow-by filters of the invention showed a slight increase in differential pressure during loading, the level of pressure increase was less than that found in the flow-through sample. Again, for purposes of the graph of FIG. 8, the differential pressure changes during loading were measured using filters that were subjected to 40 mg/ml of ISO12103-1 A2, fine test dust in diesel fuel at a flow rate of 1 liter/min. The flow-by filter had an exposed media face of approximately 16.7 cm$^2$, which is dissimilar to the size of the flow-through filter that was tested, wherein the sizes were chosen mimic flow rate with respect to filter size for a possible on-engine application. As is illustrated in FIG. 8, the flow-by filter had a relatively high starting differential pressure and a low pressure increase as compared to the tested flow-through filter.

Figure 9:
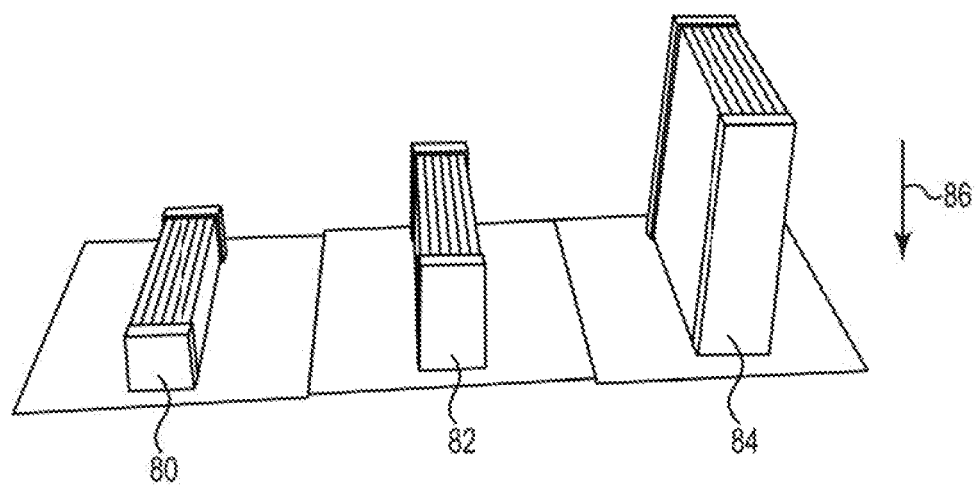
FIG. 9 is a perspective view of three exemplary flow-by filters of the invention having different sizes.

FIG. 9 illustrates three exemplary configurations of filtration systems of the invention with differing depths. The filters shown were made with 55 layers of both contaminant retention and flow-defining media stacked into a housing having a footprint of 0.86"×3". The edges of all layers were sealed by potting into epoxy (EPIC Resin S7292A&B) and were mounted onto a bottom steel plate. The first filter 80 was relatively short (e.g., 1 inch deep), the second filter 82 was taller than the first filter 80 (e.g., 2 inches deep), and the third filter 84 was taller than both of the filters 80, 82 (e.g., 4 inches deep). These three filters were tested by running contaminated fluid through the filters 80, 82, 84 in the flow direction 86 to determine the role of depth on performance of flow-by filters of the invention. In accordance with this aspect of the filters of the invention, "depth" refers to the length of the filter with respect to the direction of flow.

Figure 10:
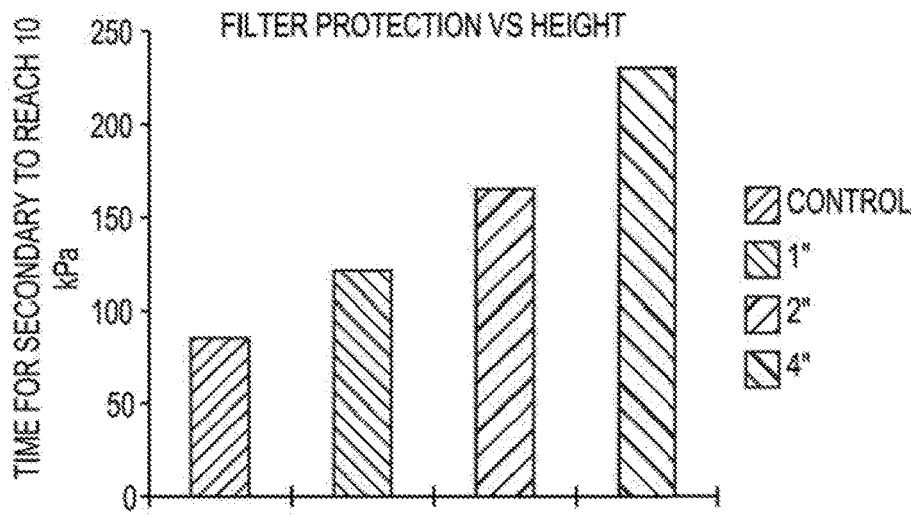
FIG. 10 is a graph illustrating the effect of prefilter depth on their respective protective abilities for exemplary flow-by filters of the invention.
Figure 11:
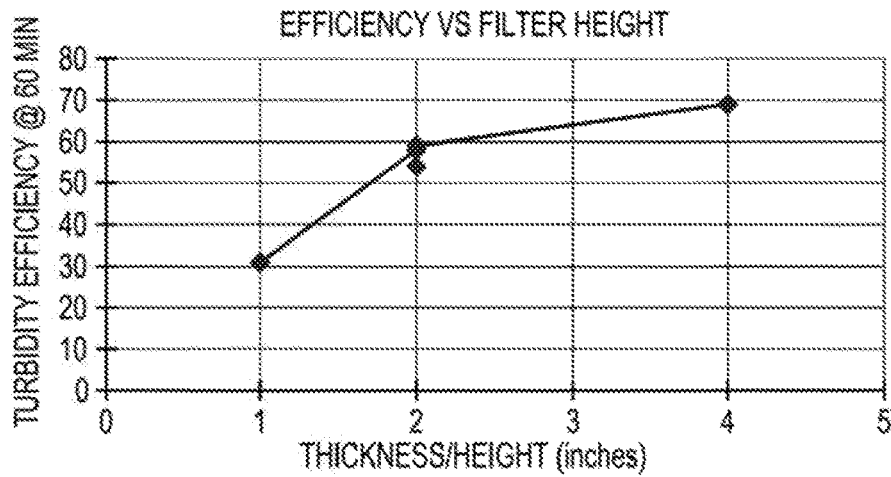
FIG. 11 is a graph illustrating the effect of prefilter depth on their respective contaminant removal efficiencies for exemplary flow-by filters of the invention.
Figure 12:
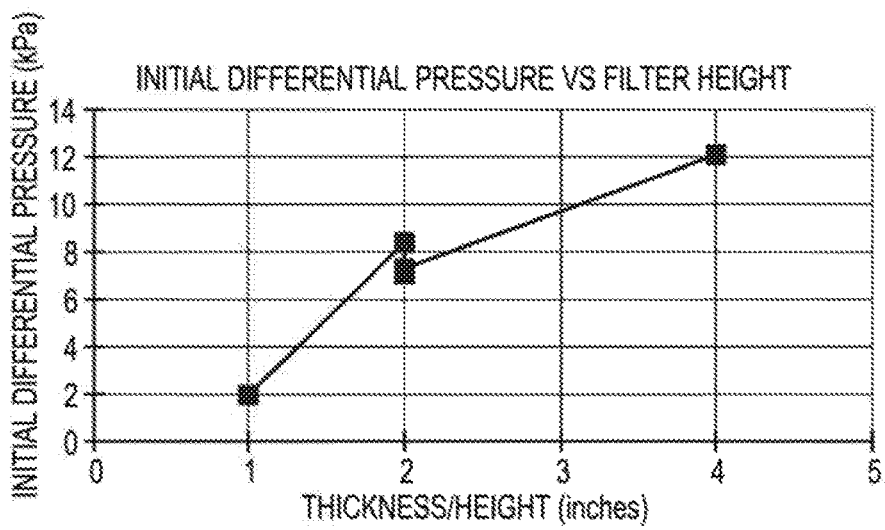
FIG. 12 is a graph illustrating the effect of prefilter depth on their respective initial differential pressures for exemplary flow-by filters of the invention.

FIGS. 10-12 are graphs that illustrate how changing the depth of a flow-by filter can increase its protective ability, efficiency, and differential pressure, respectively. For these graphs, filters were constructed of media containing bi-component binder fibers and micro-glass for the contaminant retention layer, along with a flow defining layer of polypropylene screen R0412-10PR available from Delstar Technologies of Middletown, DE. The filter assembly was subjected to flow of diesel fuel at 1 liter/minute for removal of ISO12103-1 A2, fine test dust. The protective ability of a flow-by filter is shown in FIG. 10 and refers to the pressure drop measured across a second filter that was placed downstream of the flow-by device. In this two filter setup, the flow-by filter "protected" the second filter by capturing at least a portion of the contaminant. The time it took for the second filter to reach 10 kPa was measured, and this measurement was used to determine the relative amount of contaminant retained on the flow-by filter. In these tests, the control sample did not use a flow-by filter and the downstream filter consisted of two layers of Synteq XP efficiency material, as is commercially available from Donaldson Company, Inc. of Bloomington, Minnesota.

As discussed herein, the amount of filtration protection provided relates to the initial efficiency of the flow-by filter and how long that efficiency was maintained. The relationship between flow-by filter initial efficiency versus depth of an exemplary filter that was subjected to flow of diesel fuel at 1 liter/minute for removal of ISO12103-1 A2, fine test dust is shown in the graph of FIG. 11. When analyzed in terms of penetration, the amount of contaminants that passed through the flow-by filter was found to generally have power law dependence with regard to depth. That is, for a flow-by filter that was doubled in depth, the contaminant penetration was approximately the square root of the original penetration. Thus, if a filter was increased to triple its depth, it would deliver approximately the cube root of the original penetration. However, the increased efficiency coincided with additional differential pressure across the filter, as is shown in the graph of FIG. 12, which illustrates the increase in differential pressure that accompanies deeper filters. That is, deeper flow-by filters were shown in this exemplary embodiment to remove more contaminants at the cost of higher differential pressure.

Figure 13:
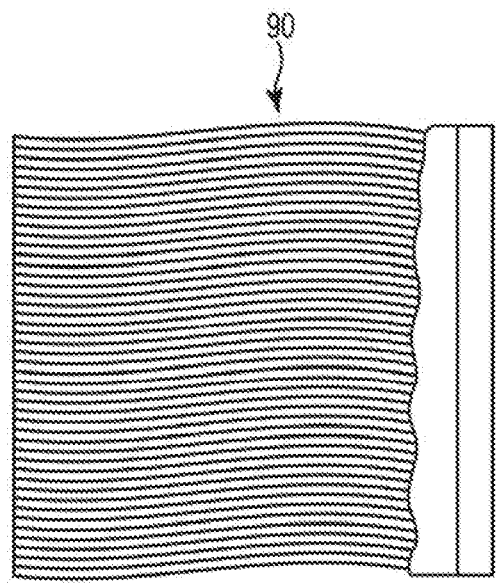
FIG. 13 is a top view of an exemplary stack of flow defining layers and alternating contaminant retention layers bound along one edge, in accordance with an embodiment of the invention.

Flow-by filters of the invention can be provided in a wide variety of configurations, wherein each of these configurations involves a flow path in which fluid moves across the face of one or more contaminant retention layers. FIG. 13 illustrates a top view of an exemplary stack 90 of flow defining layers and alternating contaminant retention layers bound along one edge, in accordance with an embodiment of the invention. When in use, this stack of layers 90 can be positioned within a housing or other structure that compresses the layers by a desired amount and/or maintains the stack of layers at a certain compression level once they are positioned within the housing. In one exemplary embodiment, the surface area of the contaminant retention material of the flow face of a compressed stack of materials of the invention comprises approximately 40-80% of the total area of the flow face.

With the embodiment of FIG. 13 and other embodiments of the invention, the number of layers in a stack can vary widely, but can be in the range of 40-100 layers per inch, or more specifically can be in the range of 55-75 layers per inch, or can even more specifically be 65 layers per inch. It is understood, however, that more or fewer layers can be used in a particular stack.

Figure 14:
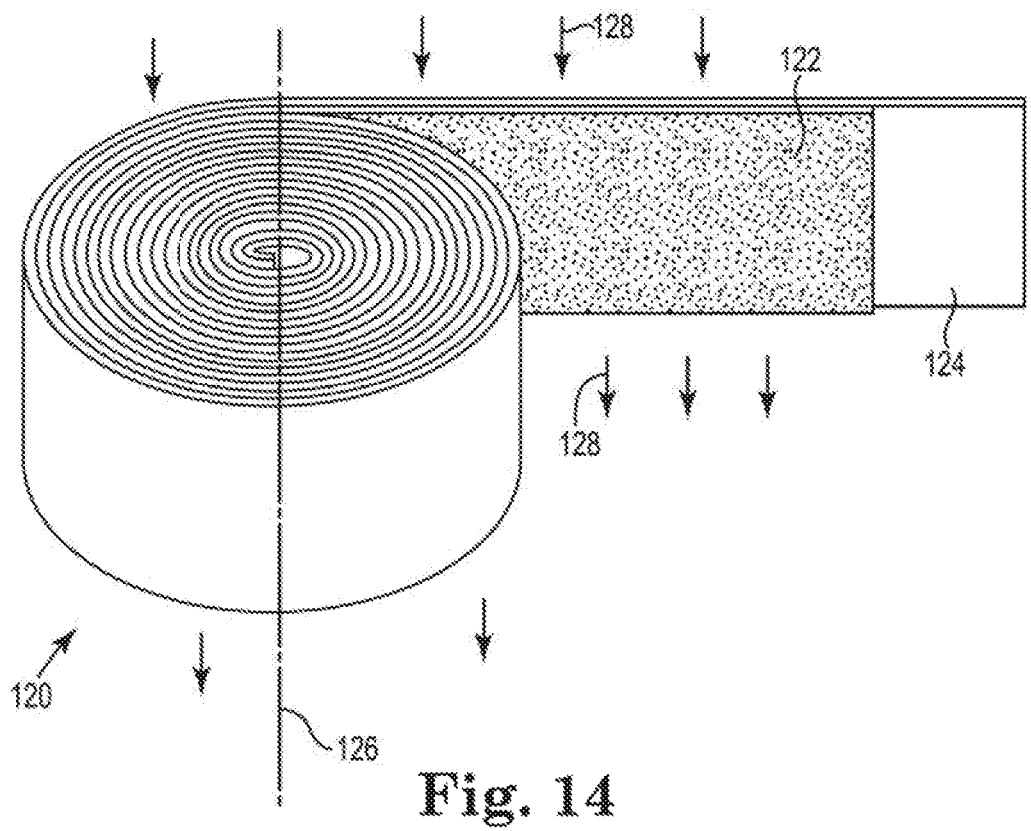
FIG. 14 is a perspective view of an exemplary configuration of a flow defining layer and a contaminant retention layer positioned adjacent to each other and rolled together into a coiled configuration.

FIG. 14 illustrates another exemplary arrangement 120 of at least one flow defining layer 122 and at least one contaminant retention layer 124 arranged in a rolled configuration about a central longitudinal axis 126. In this illustrated embodiment, the flow defining layer 122 is placed in contact with the adjacent contaminant retention layer 124, and the pair of layers is rolled either about itself or around a core that extends along the longitudinal axis 126 to create a cylindrical filter. In this configuration, fluid will flow in a direction 128 from the top of the rolled layers (i.e., one end of the cylindrical filter) to the bottom of the rolled layers (i.e., the opposite end of the cylindrical filter) across the rolled faces of the flow defining layer 122 and contaminant retention layer 124. Alternatively, fluid can flow in the opposite direction (i.e., from the bottom of the roll to the top of the roll).

Figure 15:
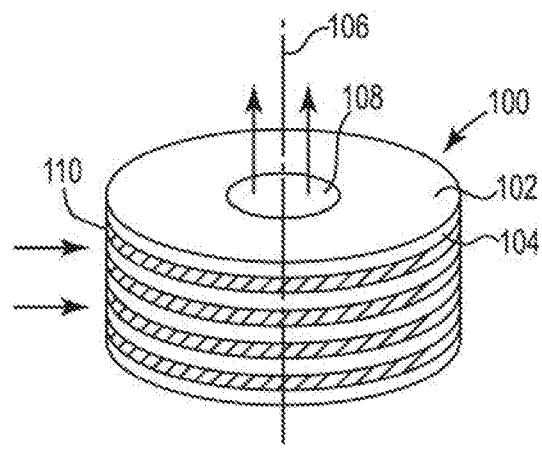
FIG. 15 is a perspective view of an exemplary configuration of a stack of flow defining disks and alternating contaminant retention disks arranged along a longitudinal axis.

FIG. 15 illustrates another exemplary configuration of a stack 100 of flow defining disks 102 and alternating contaminant retention disks 104 arranged along a longitudinal axis 106. As shown, each of the disks 102, 104 has a central opening 108 such that each of the disks of the stack is concentrically positioned along the longitudinal axis 106. In this embodiment, fluid will flow either from outer edges 110 of the disks toward the central opening 108 of the disks or from the central opening 108 of the disks toward the outer edges 110 across the face of the contaminant retention disks 104 in a flow-by type of flow path. That is, fluid flow will be generally perpendicular to the longitudinal axis 106.

Other stack shapes other than cylindrical and rectangular are also contemplated by the invention, where the direction of fluid flow will be across the faces of contaminant retention layers and flow-defining layers. For example, the stack may include layers having different shapes from each other along the height of a stack, such as an hourglass shape, a spherical shape, a pear shape, an irregular shape, and the like, in order to be adaptable for use in different filtration applications and equipment. Further, in any of the stacks of layers, the particular retention layers and flow defining layers can have similar or identical shapes and sizes, as illustrated in FIGS. 1 and 13, for example. In other embodiments, the layers can be staggered along the height of a stack, such as can be provided if either the flow defining layers or the contaminant retention layers have a size that is slightly different than the other type of layers. For one example, the flow defining layers can be slightly larger than the contaminant retention layers, which can be helpful in establishing a fluid flow path through the filter layer stack.

With any of the embodiments described herein, the filters of the invention can include flow defining layers and alternating contaminant retention layers such that there is an approximate 1:1 ratio of the different types of layers in a filter configuration. In other embodiments of the invention, the ratio can be different, such as providing a 2:1 or different ratio of flow defining layers to contaminant retention layers or providing a 2:1 or different ratio of contaminant retention layers to flow defining layers. It is further contemplated that an embodiment of the invention includes no flow-defining layers, but that fluid flow is still directed along the faces of the contaminant retention layers.

Figure 16:
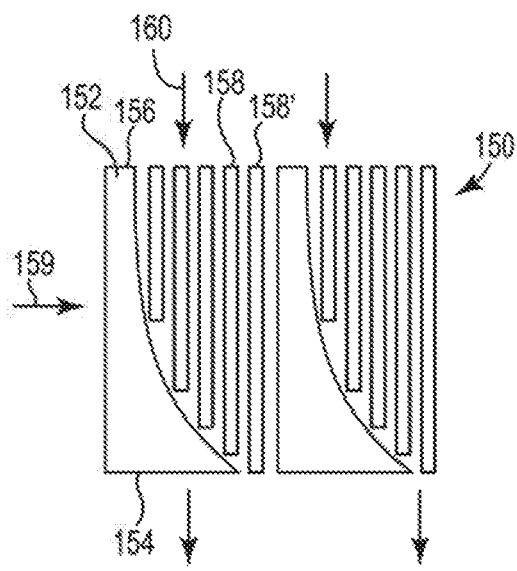
FIG. 16 is a schematic side view of another exemplary arrangement of multiple flow defining layers and contaminant retention layers arranged in a stack.

FIG. 16 is a schematic view of another embodiment of flow defining layers and contaminant retention layers arranged in a stack 150 that may be referred to as an asymmetrical stack. As shown, stack 150 includes contaminant retention layers 152 that vary in thickness such the portion of the layer 152 at an edge 154 is thicker than the portion of the layer 152 at the opposite edge 156. The thickness can be tapered, as shown, or can be provided as more of a stepped configuration. The difference between the thickness at the edges 154 and 156 can be slight or large, depending on the application.

The stack 150 further includes multiple flow defining layers 158 having varying lengths that are positioned within the tapered area of each contaminant retention layer 152. In this embodiment, four of such flow defining layers 158 are positioned within the tapered area and one flow defining layer 158' is positioned between a flow defining layer 158 and the next adjacent contaminant retention layer 152; however, it is understood that the ratio of flow defining layers 158 to contaminant retention layers 152 can vary from the 1:5 ratio illustrated in this figure. The number and ratio of layers 152 and 158 can also be chosen depending on the compression that will be applied in direction 159 that allows for a particular fluid flow and filtration characteristics for the material to be filtered.

In the embodiment illustrated in FIG. 16, material flow moves in a direction 160 relative to the layers 152, 158 to provide the flow-by characteristics discussed herein (i.e., in a downward direction, in this illustration). Thus, the flow faces for this embodiment will be generally perpendicular to the flow direction 160. In an alternate use of this stack 150, the material flow moves in a direction that is opposite to the illustrated direction 160 (i.e., in an upward direction, relative to this illustration). In further alternatives of this embodiment, the layers designated by reference number 152 may instead be flow defining layers and the layers designated by reference number 158 may be contaminant retention layers, wherein the contaminated material may either flow in direction 160 or in the opposite direction.

Figure 17:
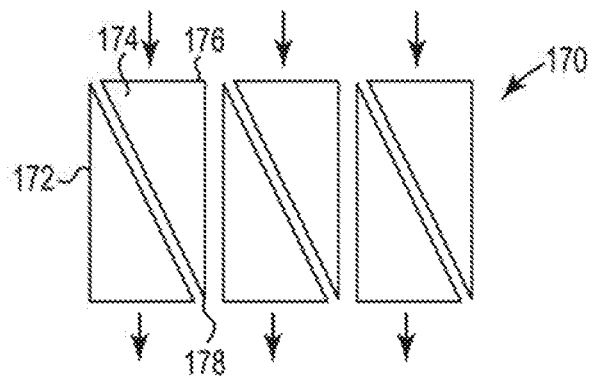
FIG. 17 is a schematic side view of another exemplary arrangement of multiple flow defining layers and contaminant retention layers arranged in a stack.

FIG. 17 is a schematic view of another embodiment of flow defining layers and contaminant retention layers arranged in a stack 170 that may be referred to as asymmetrical stacking. As shown, stack 170 includes contaminant retention layers 174 that vary in thickness such the portion of the layer 174 at an edge 176 is thicker than the portion of the layer 174 at the opposite edge 178. The thickness can be tapered, as shown, or can be provided as more of a stepped configuration. The difference between the thickness at the edges 176 and 178 can be slight or large, depending on the application. The stack 170 further includes multiple flow defining layers 172 that are tapered in generally the opposite manner to mate with an opposing contaminant retention layer 174.

The taper of the flow defining layers 172 and the contaminant retention layers 174 is intended to be exemplary in the illustrations, and may instead include any number of different mating layers that are arranged to arrive at a certain thickness and density for a particular filtration application. The number and ratio of layers 172 and 174 can be chosen depending on the compression that will be applied to the stack that allows for a particular fluid flow and filtration characteristics for the material to be filtered.

As with the embodiment of FIG. 16, the material flow for the embodiment of FIG. 17 is in a direction relative to the layers 172, 174 to provide the flow-by characteristics discussed herein (e.g., in a downward direction, in this illustration). Thus, the flow faces for this embodiment will be generally perpendicular to the flow direction. In this way, the contaminated material will first encounter more of the contaminant retention layer as it enters the stack 170, where the proportion of flow defining layer that is encountered will increase when moving through the stack. In an alternate use of this stack 170, the material flow moves in a direction that is in an upward direction, relative to this illustration, such that the contaminated material will first encounter more of the flow defining layer material as it enters the stack 170, where the proportion of contaminant retention layer that is encountered will increase when moving through the stack.

Flow-by filters of the invention that are described above can be used in a wide variety of filtration applications. For one example, flow-by filters can be used alone in systems in which the predicted performance of the filter matches the filtration needs of the system. In other applications, a flow-by filter may be used in a multi-filter arrangement in order to provide the necessary protection for fuel system for an engine, for example. Possible additional usages for stacked/rolled prefilters include prefiltration for bulk fuel, prefiltration for on-engine applications, replacement of the primary filter for on-engine applications, as a bypass filter for oil, as a kidney loop filter for oil, and/or as an engine oil filter.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A filter comprising:
    a first flow face extending along a length and a width of the filter, wherein the first flow face comprises at least one contaminant retention layer first edge and at least one flow defining layer first edge;
    a second flow face spaced in an axial direction from the first flow face, wherein the second flow face extends along the length and the width of the filter and comprises at least one contaminant retention layer second edge and at least one flow defining layer second edge;
    at least one contaminant retention layer extending from the contaminant retention layer first edge to the contaminant retention layer second edge;
    at least one flow defining layer adjacent to at least one of the contaminant retention layers, the at least one flow defining layer extending from the flow defining layer first edge to the flow defining layer second edge;
    a depth extending from the first flow face to the second flow face;
    first and second sides spaced from each other across the width of the filter and extending along the length and the depth of the filter;
    first and second ends spaced from each other across the length of the filter and extending along the width and the depth of the filter;
    wherein the at least one contaminant retention layer and the at least one flow defining layer are planar, non-fluted members arranged as a stack of layers, with planar surfaces of adjacent contaminant retention layers and flow defining layers in contact with each other;
    wherein the stack of layers is compressed within a housing; and
    wherein the filter is sealed along the first and second ends so that fluid may only flow axially through the filter in a single fluid flow path direction that extends axially from the first flow face to the second flow face.

2. The filter of claim 1, wherein the at least one contaminant retention layer comprises multiple contaminant retention layers.

3. The filter of claim 1, wherein the at least one flow defining layer comprises multiple flow defining layers.

4. The filter of claim 1, further comprising an alternating pattern of contaminant retention layers and flow defining layers across the width of the filter.

5. The filter of claim 1, wherein at least one of the flow defining layers comprises a first surface, an opposite second surface, and a plurality of apertures extending from the first surface to the second surface.

6. The filter of claim 1, wherein at least one of the flow defining layers is at least partially compressed into a thickness of one of the contaminant retention layers.

7. The filter of claim 1, wherein the at least one contaminant retention layer comprises filtration media that extends from the first flow face to the second flow face.

8. The filter of claim 1, wherein the first flow face comprises an inlet for material flow and the second flow face comprises an outlet for material flow.

9. The filter of claim 1, wherein the at least one flow defining layer comprises fibers having a first mean fiber diameter and the at least one contaminant retention layer comprises fibers having a second mean fiber diameter that is different from the first mean fiber diameter.

10. The filter of claim 1, wherein the at least one flow defining layer comprises pores having a first mean flow pore size and the at least one contaminant retention layer comprises pores having a second mean flow pore size that is different from the first mean flow pore size.

11. The filter of claim 1, wherein the first flow face is generally parallel to the second flow face.

12. The filter of claim 1, in combination with the housing, the housing at least partially surrounding the at least one contaminant retention layer and the at least one flow defining layer.

13. The filter of claim 1, wherein the depth in the axial direction of at least one of the flow defining layers is different from the depth of at least one of the contaminant retention layers.

14. The filter of claim 1, wherein the axial fluid flow direction from the first flow face toward the second flow face comprises a material flow from the first flow face to the second flow face, wherein the material flow comprises one of a fluid flow and an air flow.

15. The filter of claim 1, wherein the filter comprises a plurality of flow defining layers and contaminant retention layers arranged in a stack, and wherein the stack comprises a total of between 40 and 100 flow defining layers and contaminant retention layers per inch.

16. The filter of claim 1, wherein a plurality of contaminant retention layers and a plurality of flow defining layers are arranged in a cube configuration.

17. The filter of claim 1, further comprising:
a first filtration zone comprising a first portion of the at least one contamination retention layer and a first portion of the at least one flow defining layer, wherein the first filtration zone comprises a first permeability; and
a second filtration zone adjacent to the first filtration zone, the second filtration zone comprising a second portion of the at least one contamination retention layer and a second portion of the at least one flow defining layer, wherein the second filtration zone comprises a second permeability that is different from the first permeability of the first zone;
wherein at least one of the flow defining layers defines at least one fluid flow path in the axial direction as fluid moves through the first filtration zone and the second filtration zone.

18. A filter comprising:
a top flow face extending along a length and a width of the filter, wherein the top flow face comprises at least one contaminant retention layer top edge and at least one flow defining layer top edge;
a bottom flow face spaced in an axial direction from the top flow face, wherein the bottom flow face extends along the length and the width of the filter and comprises a at least one contaminant retention layer bottom edge and at least one flow defining layer bottom edge;
at least one contaminant retention layer extending from the top flow face to the bottom flow face;
at least one flow defining layer adjacent to at least one of the contaminant retention layers, the at least one flow defining layer extending from the top flow face to the bottom flow face;
wherein the at least one contaminant retention layer and the at least one flow defining layer are planar, non-fluted members arranged as a stack of layers, with planar surfaces of adjacent contaminant retention layers and flow defining layers in contact with each other;
wherein the stack of layers is compressed within a housing; and
wherein the at least one flow defining layer causes a material flow in the axial direction as fluid moves from the top flow face toward the bottom flow face.

19. A method of filtering fluid, comprising the steps of:
positioning a filter in a fluid flow path, the filter comprising:
a first flow face extending along a length and a width of the filter, wherein the first flow face comprises at least one contaminant retention layer first edge and at least one flow defining layer first edge;
a second flow face spaced in an axial direction from the first flow face, wherein the second flow face extends along the length and the width of the filter and comprises at least one contaminant retention layer second edge and at least one flow defining layer second edge;
at least one contaminant retention layer extending from the contaminant retention layer first edge to the contaminant retention layer second edge;
at least one flow defining layer adjacent to at least one of the contaminant retention layers, the at least one flow defining layer extending from the flow defining layer first edge to the flow defining layer second edge;
a depth extending from the first flow face to the second flow face;
first and second sides spaced from each other across the width of the filter and extending along the length and the depth of the filter;
first and second ends spaced from each other along the length of the filter and extending along the width and depth of the filter;
wherein the at least one contaminant retention layer and the at least one flow defining layer are planar, non-fluted members arranged as a stack of layers, with planar surfaces of adjacent contaminant retention layers and flow defining layers in contact with each other,
wherein the stack of layers is compressed within a housing; and
wherein the filter is sealed along the first and second ends so that fluid may only flow axially through the filter in a single fluid flow path direction that extends axially at from the first flow face toward the second flow face; and
moving fluid along the fluid flow path, wherein the fluid flow path extends in the axial direction from the first flow face toward the second flow face.

20. The filter of claim 1, wherein each flow defining layer comprises a permeability that is different from a permeability of each contaminant retention layer.

* * * * *